Oct. 2, 1951     R. J. KOUPAL     2,570,131
FILTER SYSTEM
Filed March 30, 1946
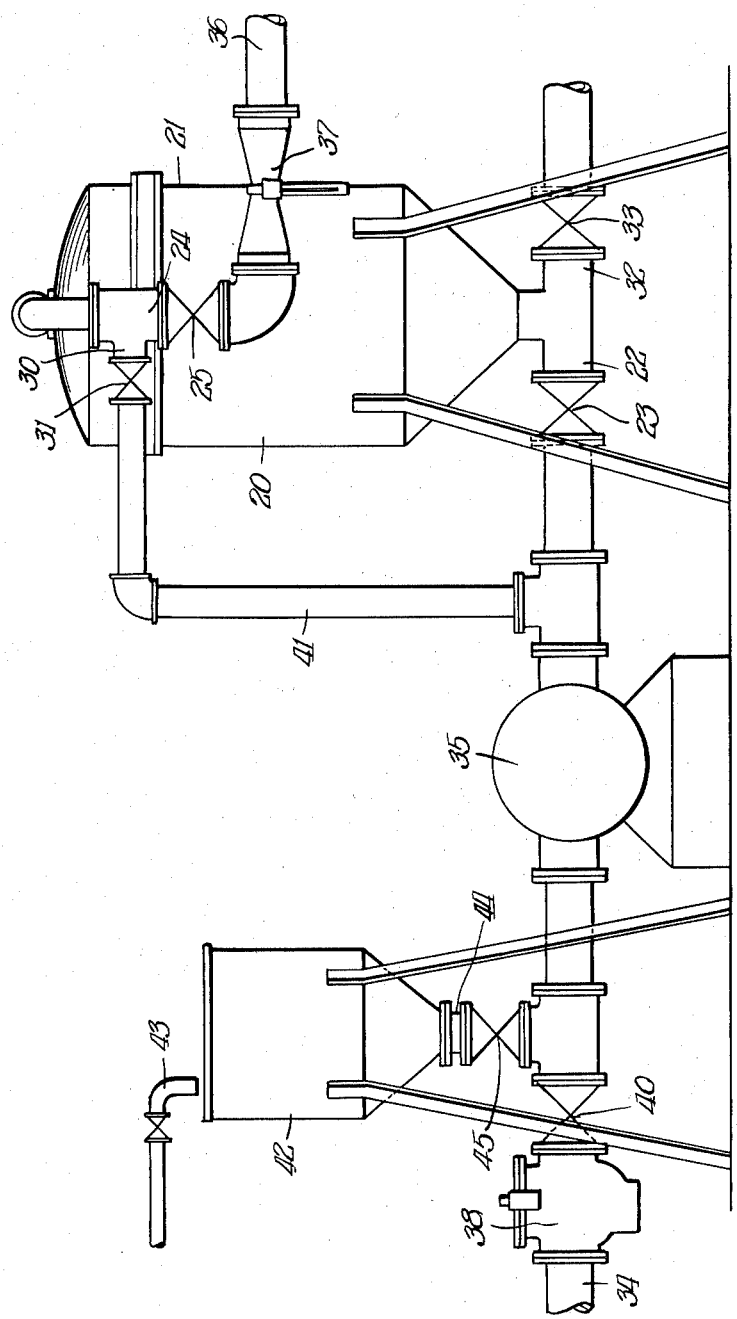
INVENTOR.
Robert J. Koupal,
BY
ATTY.

Patented Oct. 2, 1951

2,570,131

UNITED STATES PATENT OFFICE 2,570,131

FILTER SYSTEM

Robert J. Koupal, Chicago, Ill., assignor to Infilco Incorporated, Chicago, Ill., a corporation of Delaware Application March 30, 1946, Serial No. 658,441

3 Claims. (Cl. 210—11)

This invention relates to filters of the type wherein an impure liquid is filtered through a filter cake of diatomaceous or similar material. More particularly it relates to the adaptations of such diatomite filters to, and their use in, closed type filter systems, such as, for instance, a swimming pool recirculation system.

It is an object of this invention to provide a filter system for a swimming pool which is relatively cheap, highly efficient and foolproof, and needs a minimum of supervision.

Another object is a recirculating filter system such as used for a swimming pool, which delivers clear water satisfactory in pH without treatment of the water by chemicals.

Another object is to improve the operation of a diatomite filter so as to effect considerable saving in wash water and piping.

Another object is a new method of forming a diatomite filter bed.

These and other objects will become apparent from the specification and claims which follow.

Heretofore, sand filters, usually of the pressure type, have been in general use in swimming pool filter systems. In such a system pool water is customarily pumped from the pool into the filter and returns, after filtering through the filter bed, to the pool. When the filter bed becomes clogged by the impurities filtered out, the bed is backwashed, usually with pool water, and the wash water, being very dirty, must be wasted. The use of such sand filters in swimming pool systems involves relatively high initial and operating costs. Such sand filters are relatively large and the space requirements are therefore high. For a pool of 60′ x 120′ the installation and operating space for a sand filter recirculation system would be of the order of 20′ x 36′ x 10′ high, which involves 7200 cubic feet. The wash water requirements of sand filters are a multiple of the quantity of the water filtered and the waste of water involved is often a prohibitive factor for installing a swimming pool where water is scarce or expensive. Thus for a pool of 60′ x 120′ approximately 25,000 gallons of wash water are required for the backwashing. Backwashing a sand filter is a delicate operation which needs an experienced operator to avoid seriously damaging the filter.

I have found that great savings and advantages can be effected by replacing sand filters in such closed type filter systems by diatomite filters such as for instance the filters sold under the trade name "Stellar." The initial cost for the filter as well as for the piping necessary for the recirculation system is considerably lower; space requirements, and therefore the cost of land and building, are much smaller. For a pool of the size mentioned above, the installation and operating space required for a Stellar filter system amounts to 10′ x 26′ x 9′6″ high, or 2470 cubic feet, as compared to the 7200 cubic feet needed for a comparable sand filter system. While wash water required to backwash the battery of sand filters for the 60′ x 120′ pool amounts to 25,000 gallons, all of which must be wasted, only 750 gallons are needed for backwashing a battery of Stellar filters of the same filtering capacity or about 3% of the requirement for sand filters. It will be obvious that with heated indoor pools this results also in considerable saving in heat. These figures show that the use of diatomite filters in place of sand filters permits considerable saving. These savings are obtained because the available filter area is so much greater in a diatomite filter than in a sand filter of the same size. Thus a 36 inch diameter sand pressure filter has a filter area of 7.07 square feet. A 36 inch diameter diatomite filter of the type known as "Stellar" filter has a filter area of 100 square feet. In other words, for the pool of 60′ x 120′ mentioned above, two 36″ diameter Stellar filters are sufficient, whereas a battery of three 8′ diameter by 12′ long horizontal pressure sand filters would be needed.

Further substantial saving and simplification of operation is obtained by the elimination of chemical pretreatment of the water. It is usual, in swimming pool filter systems, to dose the water prior to filtration with a coagulant, to coagulate fine impurities into large, readily filterable flocs. The use of coagulants lowers the pH of the pool water and it becomes therefore necessary to feed a caustic, such as soda ash, to the water to raise its pH to a satisfactory value. This chemical treatment of the water, first by coagulants, then by caustic, is expensive. It also necessitates very careful operation to avoid over or underdosing with either or both chemicals; it is therefore usual to install chemical feeders rather than dosing manually, and such feeders are quite expensive. I have found that when using a diatomite filter in such an installation I can entirely dispense with the cost of chemical feeding. No coagulant is needed to prepare the water for filtering, the diatomaceous filter bed, when properly formed of suitable material, retaining even the finest impurities without previous coagulation. Consequently I can also omit the use of caustic, as well as coagulant, the natural alkalinity of the raw makeup water being usually sufficient to maintain a satisfactory pH in the pool.

I have found that I can obtain further important savings and advantages by adapting the diatomite filter to the use in a recirculation system and operating it in a novel manner.

Diatomite filters generally comprise a filter casing and a filter element interposed between the inlet and the outlet of the casing. The filter element which is the support for the filter bed of diatomaceous material, may be of any suitable material, such as ceramic or other porous material and may be formed in various ways. A very efficient mode of forming such a filter bed support or element is that described in Patent No. 2,347,927 to Paterson. Briefly it comprises winding wire in form of a helix over an apertured metal sleeve or a porous tube, the windings being so closely spaced that only very small clearances are formed (customarily clearance is about 0.0027 of an inch). Whatever the specific form and material of the filter element may be, the filtering material, diatomaceous earth, kieselguhr or the like, in the past was always pumped slowly into the filter casing at the beginning of a new filter run, with the water to be filtered, and gradually deposited as a layer on the outside of the filter element. The feed of the diatomaceous material is continued until a coat of suitable thickness has been built up, this so called "precoating" of the filter generally continuing over a period of several minutes. Sometimes feeding of small quantities of filter material is carried on during the entire filter run to improve the efficiency of the coat. When the coat or layer of diatomaceous material becomes clogged by the impurities filtered out of the liquid it is washed off the support, usually by a reversal of the flow through the filter, whereby the support also is cleaned of all impurities. After backwashing is completed, a new cycle of operation starts with the formation of a new coat or layer of filter material.

In past operation of such diatomie filters it was customary to filter to waste during the so-called "precoating," i. e. the period during which a new coat or filter bed was formed. This was necessary because the filter was not fully effective before the bed was built up to a predetermined thickness. Considerable turbidity, including part of the filter material, passed through such a partially formed filter bed or coat. Thus the substantial amount of water that was used to carry the filter material into the filter, and also some of the material was lost in this coating operation.

In some cases, instead of filtering to waste during precoating, the turbid water issuing from the filter was recycled through the filter along with further quantities of filter material until the new coat was sufficiently built up and clear water was obtained. While such recirculation permits saving of water which would otherwise be wasted, it will be obvious that extra piping and valves have to be installed and a considerable amount of water must be pumped before obtaining filtered water.

I have discovered a new method of precoating a diatomaceous filter which permits one to dispense with such recirculation and all filtering to waste, and to resume filtering to use immediately after backwashing is completed, thus eliminating waste of water, power and material. As indicated above, the usual procedure of precoating is to add the filter aid gradually over a period of several minutes, through a feeder or charging funnel, to the flow of water to be filtered. Contrary to such gradual precoating I deposit the entire quantity of material needed for the coating in a body of water of suitable volume, preferably only sufficient to suspend the material therein. This body of water with contained filter material I discharge within a few instants into the filter and against the filter bed support. I have found that when operating in this manner the bed is formed completely within a period of seconds instead of the usual minutes, and is immediately fully effective to retain all turbidity. As a matter of fact, careful checking by skeptical critics failed to disclose any trace of turbidity ever reaching the swimming pool when the filter cake was formed in this manner.

It will be obvious that this new manner of operation not only saves water but eliminates also the need of filter aid feeders or the like. The body of water into which the filter aid is deposited may be contained in any suitable tank connected to the suction side of the pump which delivers the water to be filtered into the filter. The connecting pipe should be of sufficient size to permit almost instantaneous draining of the tank contents. In order to avoid any risk of air being sucked into the filter, and possibly damaging the filter coat, some means, such as a conventional float valve will preferably be provided, whereby the outlet of the tank is automatically closed when the level of the water has reached a predetermined minimum. When using my invention in a swimming pool recirculation system I have found that the usual makeup tank can be used with great advantage for this purpose. Such make-up, or surge, tanks are provided in most swimming pool installations in accordance with public health regulations to prevent back-siphoning of pool water into the raw water distribution system. By using this tank the cost and maintenance of an additional tank, piping and valves is saved.

The invention will be described in connection with the filter system of a swimming pool, for which it is particularly well fitted. However it should be understood that the invention is not limited to this particular field but is useful in any closed cycle filter system, such as an industrial waste water recirculation system. In many industries waste waters are treated to permit their reuse in the process. Such treatment may include chemical or biological processes, or sedimentation, followed by filtration, or filtration alone may be sufficient. In either case the invention is suitable for incorporation into the recirculation system. It will be understood, therefore, that I refer to swimming pools only for purposes of illustration.

My invention will be more fully understood by reference to the drawing which forms a part hereof.

The sole figure of the drawing is a diagrammatical elevation of a preferred embodiment of the apparatus of the invention.

The diatomite filter 20 which, for purposes of illustration, may be of the type that has become known in the art under the trade name "Stellar" filter, has a housing 21. An inlet for water to be filtered 22 is connected to the lower part of the housing 21. The inlet 22 may be provided with a suitable valve 23. An outlet for filtered liquid 24, provided with a valve 25, is connected to the upper part of the filter housing 21. A wash water inlet 30, provided with a valve 31, is likewise connected to the upper part of the filter. The filter has also a waste or wash water outlet 32, provided with a valve 33, from its lower portion. As is well known in the art, filter elements or filter bed supports, not shown, are interposed in such a filter between the inlet and the outlet. In the case of a "Stellar" filter, they are of the type described in the Paterson patent mentioned above, i. e. of wire helically wound around a foraminous tube. The water to be filtered may be pumped from the pool through a conduit 34 by a motor driven pump 35 interposed on conduit 34. Filtered water returns to the pool through a conduit 36. A rate of flow indicator 37 may be associated with the conduit 36. The pump may be preceded by the usual hair and lint catcher 38. The conduit 34 is provided with a main inlet valve 40 at some suitable point intermediate the pool and the pump 35 as for instance between the hair and lint catcher 38 and the pump. Preferably the wash water inlet 30 is connected to a branch conduit 41 which leads from a point on the inlet conduit 34 intermediate the pump 35 and the filter 20.

As is usual in swimming pool filter systems, a make-up water or surge tank 42 is provided into which the raw water line 43 discharges and from which raw makeup water is drawn when the pool is drained and the pool water is to be renewed. Such tanks are required to prevent back-siphoning of pool water into the raw water distribution system. The tank 42 is connected by a conduit 44 to the conduit 34 on the suction or upstream side of the pump 35 and downstream of the main inlet valve 40. The conduit 44 is provided with a valve 45, preferably of the quick acting type. As indicated above, I utilize the tank 42 as a combined makeup water and filter aid feed tank. The tank 42 may be quite small, as only a small quantity of water is needed for forming the filter bed in my new manner. With a pump of 800 gallons per minute, for instance, a tank holding 200 gallons will be sufficient. The surge tank of such an installation is usually quite small, as its only purpose is replacing a fixed connection between distribution system and swimming pool system. However, it will be understood, that where a large tank is already provided in an installation, this may be used for my purpose without difficulty. The quantity of water used in forming the bed is not sharply critical, and the tank may be filled only partially for the precoating. The outlet of the tank 42 and the conduit 44 should be of sufficient size to allow instantaneous draining of the necessary quantity of water by the pump 35. Preferably, to prevent air from being sucked into the filter, a float valve or other suitable means, not shown, will be provided for closing the outlet of the tank 42 when the water has been drained down to a minimum level.

In operation of swimming pool filter systems it is usual to shut the filters down overnight and to backwash them before filtering is resumed. It will be obvious that when the inlet pressure is shut off, the filter bed of a diatomite filter will drop off its support. This greatly facilitates and shortens the backwashing operation which is completed within a few seconds. Before backwashing of the filter is started the filter inlet valve 23, the outlet valve 25 for filtered water and the valve 45 on the conduit 44 from the makeup water tank 42 will be in closed position and the main inlet valve 40, the wash water valve 31 and the waste valve 33 open. When the pump 35 is started with the various valves in this position pool water will be forced through conduit 34, branch conduit 41, and wash water inlet 30 into the upper part of the filter 20, whence it will flow downwardly and outwardly through the elements to be discharged through the waste outlet 32. On its way through the elements the pressure water cleans the interstices and walls of the elements of any adhering impurities and filter material. The wash water also picks up the coating material that has fallen from the supports into the lower portion of the filter upon release of the inlet pressure, and carries it out of the filter. This washing of the filter is completed in a matter of a few seconds as compared with the prolonged periods needed for washing of a sand filter. Another advantage is that the washing operation is entirely foolproof, and needs no experienced operator. In a sand filter there is always the danger of disturbing or damaging the filter bed by inefficient washing, or the bed may not be thoroughly cleansed with consequent loss in efficiency, shortening of filter runs, formation of mud balls and the like. No such difficulties can arise in a diatomite filter and its use in swimming pool installations, where only a minimum of service is usually available, is therefore very advantageous.

When washing is completed a new coat of filter bed material has to be formed. The entire material needed for the filter bed is placed in the makeup tank 42, and sufficient water added to suspend the material therein. Before starting the precoating operation the backwash valve 31 and the drain valve 33 are closed, and the filter inlet valve 23 and filtered water outlet valve 25 are opened. The main inlet valve 40 is partially closed, sufficiently to permit the pump 35 to exert a strong suction on the contents of the tank 42, when the valve 45 is opened. With the main inlet valve 40 thus throttled, the pump 35 is started and the quick acting valve 45 on conduit 44 from the makeup tank 42 is fully opened. The pump will then suck the water with contained filter material from tank 42 and pump it into the filter within a few instants. The filter material is forced against the surface of the elements and forms a coat thereon which immediately is effective to retain all turbidity. Therefore it is not necessary to filter to waste when precoating is effected in this new manner. The water carrying the filter material may immediately be sent to the pool, as it carries no turbidity and filtering is thus resumed simultaneously with the coating operation. As soon as the water in the makeup tank 42 has reached the predetermined lower level, the outlet of the makeup tank is closed by some automatic means, such as a float valve, or where such means is not provided the operator closes the valve 45 immediately after he has opened it. The entire withdrawal of the filter aid and the necessary quantity of water actually takes no longer than the opening and closing of a valve. So quickly is the filter bed built up after the opening of the valve 45, that the operator may start to turn the main inlet valve 40 to its fully open position immediately after he has opened the valve 45 of the makeup water tank. By the time the main inlet valve 40 is fully open the filter bed is already formed and filtering proceeds thereafter automatically and without needing any attention until the filters are again closed down for the night.

It should be noted that no chemicals need be used in my process to treat the water before filtering. The coat formed in the new manner described above is effective to retain all turbidity without previous preparation of the pool water by treatment with coagulants. Consequently the pH of the pool water is not lowered and remains satisfactory without addition of caustic. It will be obvious that the elimination of chemical treatment of the water cuts the cost of the treatment quite considerably.

The filter aid used for the filter bed should be selected carefully so that its grain size is suitably proportioned to the interstices of the support for maximum efficiency. For instance, for a "Stellar" filter having .0027 inch spaces between wires I have found a filter aid with a relatively coarse grain very effective. The quantity of material required for a filter bed is quite small, about 1½ ozs. per square foot of filter area. Therefore the cost of the filter material is quite negligible, about one fifth of a cent per thousand gallons of water filtered. In view of this low cost it is usual practice to waste the filter aid material with each backwashing.

It will be obvious that the filter plant of my invention affords many savings in initial cost and operation and is very simple and foolproof. It will also be understood that many changes could be made in the embodiment shown and described for exemplification and illustration without departing from the spirit and scope of the invention. Therefore I do not wish to limit myself to the exact construction of this embodiment.

I claim:

1. A filter plant consisting of a main adapted to be connected to a swimming pool, a pump associated with said main in such manner as to pump water from said pool, a diatomite filter having an inlet connected to said main on the discharge side of said pump, diatomaceous material feeding means having an outlet connected to said main on the suction side of said pump, an outlet from said filter, a conduit leading from said outlet and adapted to be connected to the pool, a wash water outlet from said filter, a wash water inlet to said filter, a conduit connecting said wash water inlet to said main on the discharge side of said pump and upstream of said filter, valves associated with said inlets and said outlets, and a valve on said main upstream of the point of discharge of diatomaceous material into said main.

2. A method of operating a swimming pool filter system comprising continuously pumping unfiltered pool water through the filter cake of a diatomite filter and thence back to the pool until backwashing of the filter becomes necessary, then pumping unfiltered pool water in reverse direction through the filter and thence to waste until the filter cake is washed off and the filter cleaned, then forming a new filter cake on the filter by rapidly discharging the entire material for the new filter cake into the filter, whereby said filter cake is built up within a few seconds, and simultaneously therewith resuming said pumping of unfiltered pool water through said filter to the pool.

3. In the operation of a closed filter system of the type wherein a predetermined quantity of water is pumped from a basin through a diatomite filter and thence returned to the basin during filtering, and is pumped in reverse direction through the filter and thence to waste during backwashing, the method of forming a new filter cake and starting a new filter run after backwashing which comprises the steps of depositing the filter cake material in a body of water of sufficient volume to suspend the filter cake material therein, rapidly pumping the entire body of water with contained filter cake material into the filter together with a quantity of water from said basin less than said predetermined quantity and passing all the water thus pumped into the filter, including the water wherein said filter cake material was suspended from said filter to said basin, and immediately thereafter resuming pumping of the predetermined quantity of water from said basin through said filter and thence back to said basin.

ROBERT J. KOUPAL.

REFERENCES CITED

The following references are of record in the file of this patent:

UNITED STATES PATENTS

| Number | Name | Date |
| --- | --- | --- |
| 1,438,797 | Vachier | Dec. 12, 1922 |
| 1,579,171 | Zoul | Mar. 30, 1926 |
| 1,629,418 | Smith | May 17, 1927 |
| 1,691,001 | Vallez | Nov. 6, 1928 |
| 1,932,569 | Bell | Oct. 31, 1933 |
| 2,013,776 | Wiesman | Sept. 10, 1935 |
| 2,087,775 | Mathews | July 20, 1937 |
| 2,214,671 | Hagan | Sept. 10, 1940 |
| 2,347,927 | Paterson et al. | May 2, 1944 |

FOREIGN PATENTS

| Number | Country | Date |
| --- | --- | --- |
| 489,024 | Great Britain | of 1936 |